(12) United States Patent
Soni et al.

(10) Patent No.: US 12,743,123 B2
(45) **Date of Patent: *Sep. 22, 2026**

(54) INTERRUPT HANDLING METHOD AND APPARATUS FOR SLOW PERIPHERALS

(71) Applicant: Texas Instruments Incorporated, Dallas, TX (US)

(72) Inventors: Maneesh Soni, Bangalore (IN); Rajeev Suvarna, Bangalore (IN); Nikunj Khare, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 18/804,364

(22) Filed: Aug. 14, 2024

(65) Prior Publication Data

US 2024/0411341 A1 Dec. 12, 2024

Related U.S. Application Data

(63) Continuation of application No. 16/995,852, filed on Aug. 18, 2020, now Pat. No. 12,105,550, which is a continuation of application No. 15/420,267, filed on Jan. 31, 2017, now Pat. No. 10,788,853.

(51) Int. Cl.
*G06F 1/12* (2006.01)
*G06F 13/24* (2006.01)

(52) U.S. Cl.
CPC ................ *G06F 1/12* (2013.01); *G06F 13/24* (2013.01)

(58) Field of Classification Search
CPC .................................. G06F 1/12; G06F 13/24
See application file for complete search history.

(56) References Cited

U.S. PATENT DOCUMENTS

| | | | |
|---|---|---|---|
| 5,900,753 | A | 5/1999 | Cote et al. |
| 6,507,609 | B1 | 1/2003 | Haubursin |
| 7,934,113 | B2 | 4/2011 | Chard et al. |
| 10,014,041 | B1 | 7/2018 | Khare et al. |
| 11,112,820 | B1 | 9/2021 | Kao |
| 11,200,184 | B1 | 12/2021 | Lai et al. |

(Continued)

FOREIGN PATENT DOCUMENTS

| | | |
|---|---|---|
| CN | 1813437 A | 8/2006 |
| CN | 102792167 A | 11/2012 |

(Continued)

OTHER PUBLICATIONS

International Search Report and Written Opinion, PCT/US2018/016206, mailed May 4, 2018 (7 pages).

(Continued)

*Primary Examiner* — Brian T Misiura
(74) *Attorney, Agent, or Firm* — Michelle F. Murray; Frank D. Cimino

(57) ABSTRACT

Disclosed examples include interrupt handling circuitry and methods for managing interrupts of a fast clock domain circuit operated according to a first clock signal by a slow clock domain circuit operated according to a second clock signal in which an interrupt generator circuit generates an interrupt input signal synchronized to the second clock signal, and an interrupt clear circuit selectively resets the interrupt generator circuit in response to an acknowledgment signal from the first circuit asynchronously with respect to the second clock signal.

21 Claims, 6 Drawing Sheets

(56) References Cited

U.S. PATENT DOCUMENTS

| | | | |
|---|---|---|---|
| 2002/0019898 | A1 | 2/2002 | Hayashi et al. |
| 2002/0053927 | A1 | 5/2002 | Stevens |
| 2002/0188785 | A1 | 12/2002 | Fujiki |
| 2006/0064529 | A1 | 3/2006 | Anand et al. |
| 2008/0288696 | A1 | 11/2008 | Abt |
| 2008/0290914 | A1 | 11/2008 | Chard et al. |
| 2011/0096880 | A1 | 4/2011 | Steinbusch et al. |
| 2012/0323523 | A1 | 12/2012 | Yoshikawa |

FOREIGN PATENT DOCUMENTS

| | | | |
|---|---|---|---|
| CN | 103631649 | A | 3/2014 |
| EP | 0469543 | A2 | 2/1992 |
| JP | 2002149419 | A | 5/2002 |
| JP | 2009282780 | A | 12/2009 |

OTHER PUBLICATIONS

Extended European Search Report; PCT/US2018016206; dated: Apr. 5, 2020; 9 pages.

First Office Action mailed Dec. 2, 2022, Chinese Application No. 2018800091312, 15 pages.

First Office Action mailed Sep. 13, 2021, Japanese Application No. 2019-562234, 6 pages.

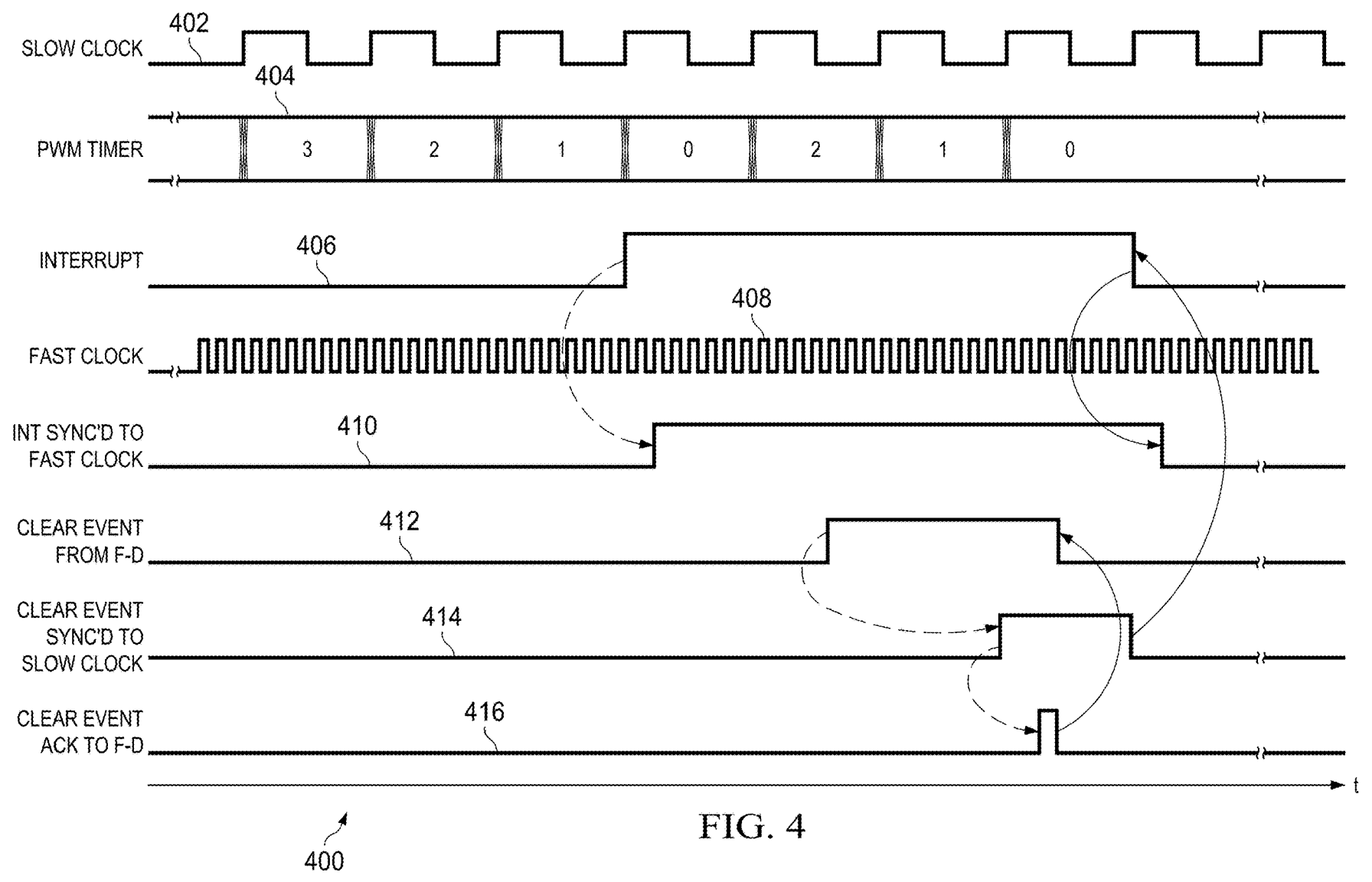

SLOW CLOCK
402
PWM TIMER
404
3 2 1 0 2 1 0
INTERRUPT
406
FAST CLOCK
408
INT SYNC'D TO FAST CLOCK
410
CLEAR EVENT FROM F-D
412
CLEAR EVENT SYNC'D TO SLOW CLOCK
414
CLEAR EVENT ACK TO F-D
416
t
400

FIG. 4

INTERRUPT HANDLING METHOD AND APPARATUS FOR SLOW PERIPHERALS

CROSS REFERENCED TO RELATED APPLICATIONS

This application is a continuation of U.S. patent application Ser. No. 16/995,852, filed Aug. 18, 2020, which is a continuation of U.S. patent application Ser. No. 15/420,267, filed Jan. 31, 2017, now U.S. Pat. No. 10,788,853, issued Sep. 29, 2020, all of which are hereby incorporated herein by reference in their entireties.

BACKGROUND

Electronic circuits and systems often include multiple circuit segments or clock domains that operate at different clock speeds. For example, processor circuits often operate at high clock speeds and interact with one or more peripheral circuits that run at much lower clock speeds. A slow clock domain circuit often generates interrupt service requests for servicing by the fast clock domain circuit. Servicing and clearing an interrupt from a slow clock domain circuit may take many fast clock cycles and can lead to inability of the fast clock domain circuit to service other interrupts. In one example, interrupts from peripheral circuits operating at very slow frequencies (e.g., 10-100 KHz) are serviced by a CPU operating at high clock frequencies of 1-100 MHz or even higher. Application software executed by a fast clock domain processor circuit or CPU may need to update or write a new counter value in a register of a low clock speed pulse width modulation (PWM) control circuit in response to an interrupt triggered by the counter value reaching a predetermined value. Previous interrupt handling techniques and circuits synchronize a clear request from the servicing CPU to the slow clock signal and/or use a handshaking approach to clear the interrupt request. This results in a delay of two or more slow clock cycles before the peripheral circuit receives the clear request and removes the interrupt request signal. This interrupt clearance delay can be significant, particularly for large differences in the fast and slow clock speeds. For a peripheral operating at 10 KHz functional clock, the delay would be at least 200 microseconds, which is significant for a CPU operating at 100 MHz. During this time, the fast clock domain CPU must wait to avoid re-entry into the same service routing. Moreover, if another interrupt event occurs in the peripheral circuit before the initial interrupt is cleared, the new interrupt event from the same peripheral will be lost. In addition, conventional interrupt handling circuits and techniques generate interrupt requests with some latency. For example, the slow clock domain interrupt generation conditions may be based on rising slow clock edges and the interrupt request signal is generated according to a rising slow clock edge or vice versa, where synchronization to the slow clock signal introduces further delays in servicing an interrupt event.

SUMMARY

Disclosed examples include interrupt handling circuitry and methods for managing interrupts of a fast clock domain first circuit by a slow clock domain second circuit, where the first circuit operates according to a first clock signal and the second circuit operates according to a second clock signal slower than the first clock signal. A disclosed interrupt handling circuit includes an interrupt generator circuit that generates an interrupt input signal, and an interrupt clear circuit that resets the interrupt generator circuit in response to an acknowledgment signal from the first circuit asynchronously with respect to the second clock signal.

In certain examples, the interrupt generator circuit includes a first input to receive an interrupt request signal, a second input to receive an interrupt clear signal, and an output to provide an interrupt input signal synchronized to the interrupt request signal to selectively interrupt the first circuit. The interrupt clear circuit in one example includes an output synchronized to the first clock signal to provide the interrupt clear signal to reset the interrupt generator circuit in response to an acknowledgment signal from the first circuit.

Methods are disclosed to manage interrupts of a first circuit operated according to a first clock signal by a second circuit operated according to a slower second clock signal. The methods include generating an interrupt input signal synchronized to the second clock signal, providing an interrupt output signal to the first circuit in response to the interrupt input signal, and clearing the interrupt input and output signals asynchronously with respect to the second clock signal in response to an acknowledgment signal from the first circuit.

BRIEF DESCRIPTION OF THE DRAWINGS

FIG. 4 is a signal diagram showing a handshaking acknowledgment interrupt handling technique with a missed interrupt event.

DETAILED DESCRIPTION

Figure 1:
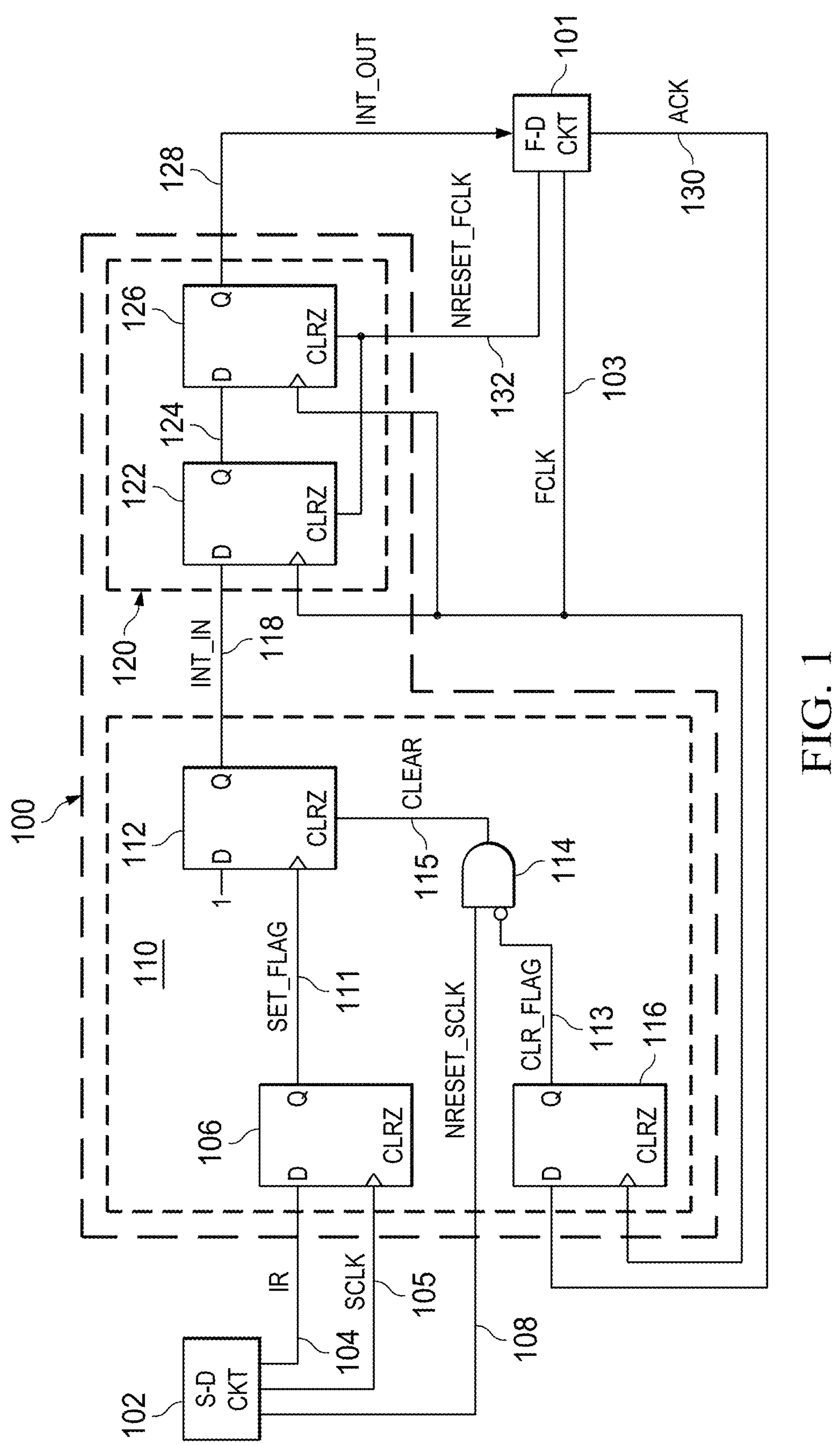
FIG. 1 is a schematic diagram showing an interrupt handling circuit configured to manage interrupts of a fast clock domain first circuit by a slow clock domain second circuit.

In the drawings, like reference numerals refer to like elements throughout, and the various features are not necessarily drawn to scale. In the following discussion and in the claims, the terms “including”, “includes”, “having”, “has”, “with”, or variants thereof are intended to be inclusive in a manner similar to the term “comprising”, and thus should be interpreted to mean “including, but not limited to . . . ” In addition, the terms “couple”, “coupled” or “couples” are intended to include indirect or direct electrical or mechanical connection or combinations thereof. For example, if a first device couples to or is coupled with a second device, that connection may be through a direct electrical connection, or through an indirect electrical connection via one or more intervening devices and connections.

Disclosed examples include integrated circuits, and interrupt handling circuitry and processes for managing interrupts of a first circuit operated according to a first clock signal by a second circuit operated according to a slower second clock signal. The disclosed concept can be employed in a variety of different applications in which first and second clock domains or circuits are operated according to different clock speeds, which can be asynchronous or synchronous with respect to one another. In addition, the disclosed examples provide interrupt handling circuitry and methods which can be employed in association with first and second clock domain circuits of a single integrated circuit, or with respect to fast and slow clock domain circuits on separate ICs or combinations thereof.

FIG. 1 shows a system including an interrupt handling circuit 100, a first circuit 101 (a "fast domain circuit" labelled F-D CKT in the drawing) and a second circuit 102 (a "slow domain circuit" labeled S-D CKT in FIG. 1). The first and second circuits 101 and 102 respectively operate according to different first and second clock signals FCLK and SCLK. The circuits 101 and 102 can be formed in separate integrated circuits (ICs), or can be circuits on a single IC. The circuits 101 and 102 are part of two separate clock domains through operation according to corresponding clock signals FCLK and SCLK. The clock signals FCLK and SCLK can operate independently of one another with respect to clock phasing and/or clock frequency, although not a strict requirement of all embodiments. The first clock signal FCLK is provided by a clock source (not shown) of the first circuit 101 on a circuit node 103, and the clock signal SCLK is provided by a clock source (not shown) of the second circuit 102 on a node 105. The second clock signal SCLK is slower than the first clock signal FCLK in this example.

The interrupt handling circuit 100 includes an interrupt generator circuit 110, a synchronizer circuit 120 and an interrupt clear circuit 114, 116 to manage signaling and clearance of interrupt events associated with the second circuit 102 serviced by the first circuit 101. In the illustrated example, the interrupt generator circuit 110 includes inputs 104 and 105 as well as an output 118 and selectively interrupts the first circuit 101 synchronously with respect to the first clock signal FCLK. The interrupt clear circuit 114, 116 includes a flip-flop 116, and AND gate 114, and an output 115 synchronized to the first clock signal FCLK to selectively provide an interrupt clear signal CLEAR to reset the interrupt generator circuit 110 in response to an acknowledgment signal ACK from the first circuit 101. Moreover, the interrupt clear circuit 114, 116 clears or resets the interrupt generator circuit 110 asynchronously with respect to the second clock signal SCLK. In this manner, the interrupt handling circuit 100 mitigates or avoids synchronization delays associated with conventional interrupt clearance circuits, and facilitates response by the interrupt generator circuit 110 to further interrupts from the second circuit 102.

In operation, the second circuit 102 provides an interrupt request signal IR on a node 104 as an input to the interrupt generator circuit 110. The second circuit 102 also includes an output node 108 to provide a reset signal NRESET_SCLK to reset the interrupt generator circuit. The interrupt generator circuit 110 provides an interrupt input signal INT_IN at a node 118 as an input to the synchronizer circuit 120. The synchronizer circuit 120 provides an interrupt output signal INT_OUT at a node 128 connected to the first circuit 101. The first circuit 101, in turn, services the interrupt, and generates an acknowledgment signal ACK on a circuit node 130, provided as an input to the interrupt clear circuit 114, 116. The interrupt clear circuit 114, 116 generates an interrupt clear signal CLEAR at a node 115 to clear the interrupt input signal INT_IN.

Conventional fast/slow clock domain interrupt handling circuits and techniques typically introduce latency or delay into the interrupt request signaling, and suffer from significant delays due to slow clock domain clear signal synchronization, which can lead to delays in servicing and clearing interrupts and potentially lost or missed interrupt events.

In order to address the first problem, the present disclosure provides solutions that can generate an interrupt without significant latency. In the illustrated example, the interrupt generator circuit 110 includes an interrupt flag or interrupt generator flip-flop 112, in this case a data or "D" flip-flop that generates the interrupt input signal INT_IN according to a synchronized interrupt request signal SET_FLAG on a circuit node 111 received from a flip-flop 106. The flip-flop 106 receives the interrupt request signal IR from the node 104 as a data input, and includes a clock input connected to the slow clock node 105. In operation, the second circuit 102 activates the interrupt request signal IR in an active high state, and the flip-flop 106 generates the signal SET_FLAG on the node 111 in a high state at the next rising edge of the slow clock signal SCLK. The data (D) input of the interrupt generator flip-flop 112 is connected to a logic high signal ("1" IN FIG. 1), and the clock input of the flip-flop 112 is connected to receive the synchronized interrupt request signal SET_FLAG from the node 111. The AND gate 114 provides the CLEAR signal to the clear input CLRZ of the flip-flop 112 to selectively reset the interrupt generator circuit 110 in response to the acknowledgment signal ACK from the first circuit 101.

The interrupt generator output 118 provides the interrupt input signal INT_IN in a low first state in response to the second interrupt generator input 115 receiving the interrupt clear signal CLEAR in the low first state. The output 118 provides the interrupt input signal INT_IN in a high second state in response to a low-high transition and the synchronized interrupt request signal SET_FLAG when the interrupt clear signal CLEAR is in the high second state. When the CLEAR signal is high, the flip-flop 112 generates the interrupt input signal INT_IN in an active high state at or shortly following the rising edge of slow clock signal SCLK when the interrupt request signal IR is asserted in the high state. In this manner, the interrupt request signal SET_FLAG is synchronized to the second clock signal SCLK by the flip-flop 106 in order to avoid or mitigate metastability issues. The interrupt generation circuitry 110 provides significant advantages compared to other interrupt generation circuitry, which often suffer from half cycle or full cycle synchronization delays as illustrated and described below in connection with FIG. 5. The circuit 110 advantageously asserts the interrupt input signal INT_IN in a timely fashion relative to the rising edge of the interrupt request signal IR received from the second circuit 102.

The interrupt clear circuit 114, 116 provides the interrupt clear signal CLEAR in the low first state to reset the interrupt generator circuit 110 to set the interrupt input signal INT_IN to the low first state in response to the acknowledgment signal ACK from the first circuit 101. The flip-flop 116 in the illustrated example is a D flip-flop, with a data input "D" connected to the node 130 to receive the acknowledgment signal ACK, and a clock input connected to the node 103 to receive the first clock signal FCLK. The output "Q" of the flip-flop 116 is connected to provide a clear flag signal CLR_FLAG on a node 113 as shown in FIG. 1. The AND gate 114 receives the CLR_FLAG signal via an inverted input, and receives the reset signal NRESET_SCLK from the second circuit 102 via the node 108. This second input to the AND gate 114 allows the second circuit 102 to reset the AND gate 114. In other possible implementations, the AND gate 114 can be omitted, and the CLR_FLAG signal can be provided directly to the CLRZ input of the interrupt generator flip-flop 112. In operation, the clear circuitry 114, 116 quickly clears the flip-flop 112 in response to the ACK signal going high without synchronizing delays associated with the second clock signal SCLK, causing the interrupt input signal INT_IN and the interrupt output signal INT_OUT to go low asynchronously relative to the slow clock signal SCLK. In this manner, the pending interrupt signal INT_OUT is quickly cleared once the first circuit 101 has serviced the pending interrupt, thus allowing the first circuit 101 to receive and properly service further subsequent interrupts from the second circuit 102.

In the illustrated embodiment, the interrupt handling circuit 100 also includes the synchronizer circuit 120. In operation, the circuit 120 quickly synchronizes the interrupt input signal INT_IN with respect to the fast first clock signal FCLK in order to avoid any metastability issues with the INT_IN signal generated by the interrupt generator circuit 110. The synchronizer circuit 120 includes an input coupled with the interrupt generator output 118 to receive the interrupt input signal INT_IN, and an output 128 synchronized to the first clock signal FCLK to provide an interrupt output signal INT_OUT to the first circuit 101. The circuit 120 in this example includes a first flip-flop 122 with a data input D connected to the interrupt generator output 118, a clock input connected to receive the first clock signal FCLK. The output 124 (Q) of the first synchronizer flip-flop 122 is connected to a data input D of a second synchronizer flip-flop 126 that also has a clock input connected to the first clock signal FCLK at the node 103. The output Q of the second synchronizer flip-flop 126 is connected to the first circuit 101 to provide the interrupt output signal INT_OUT synchronized to the first clock signal FCLK. The synchronizer flip-flops 122 and 126 each include an active low clear input CLRZ connected to receive a reset signal NRESET_FCLK provided on a circuit node 132 by the first circuit 101.

Figure 2:
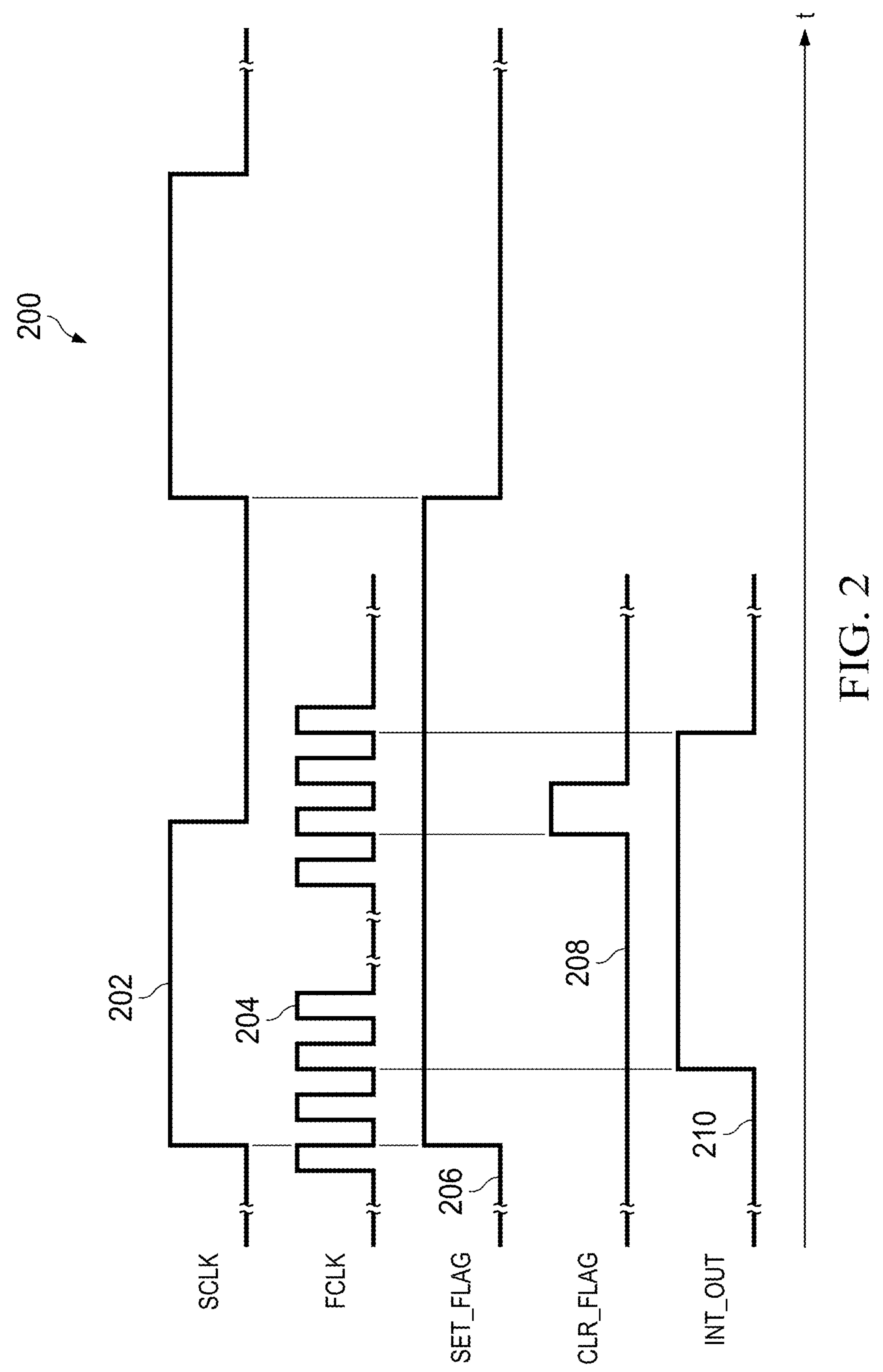
FIG. 2 is a signal diagram showing operating signals in the circuit of FIG. 1 for an arbitrary ratio of fast and slow clock speeds.

FIG. 2 shows a signal diagram 200 illustrating operating signals in the interrupt handling circuit 100 of FIG. 1 for an arbitrary ratio of fast and slow clock speeds. In this example, two example cycles of the second clock signal SCLK are shown as curve 202, and a FCLK curve 204 can have any number of fast clock signal transitions, where the first and second clock signals FCLK and SCLK can be completely asynchronous with respect to one another regarding clock speed and phase relationship. As seen in the example of FIG. 2, the flip-flop 106 of the interrupt generator circuit 110 asserts the SET_FLAG signal (curve 206) active high in response to a rising edge of the interrupt request signal IR from the second circuit 102 at a rising edge of the second clock signal SCLK (curve 202). The interrupt generator circuit 110 generates the interrupt input signal INT_IN, and the synchronizer circuit 120 synchronizes this signal, and generates a rising edge in the interrupt output signal INT_OUT (curve 210) within two FCLK cycles asynchronously with respect to the second clock signal SCLK. When the fast domain first circuit 101 completes an associated interrupt service routine, the first circuit 101 asserts the acknowledgment signal ACK at the node 130, which provides an active high data input to the interrupt clearance flip-flop 116. At the next rising edge of the first clock signal FCLK, the flip-flop 116 asserts the clear flag signal CLR_FLAG (active high, curve 208 in FIG. 2). This signal transition clears the signal generator flip-flop 112, causing the interrupt input signal INT_IN to go low. The synchronizer circuit 120 synchronizes this falling edge transition within two fast clock cycles, causing a falling edge in the interrupt output signal INT_OUT. In this manner, the interrupt handling circuitry 100 effectively clears the interrupt signal INT_OUT provided to the first clock 101 within two FCLK cycles of the acknowledgment signal ACK.

Figure 3:
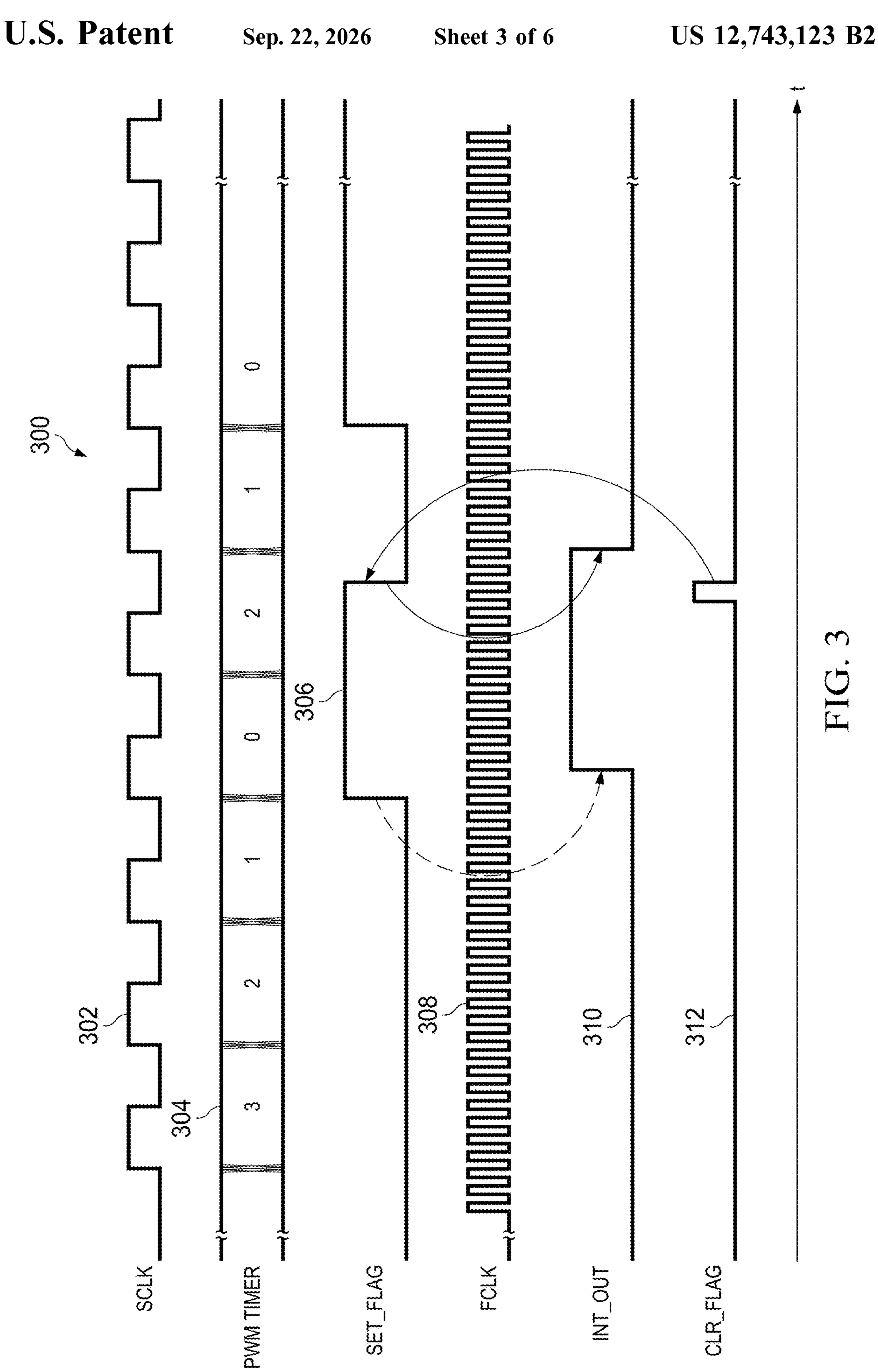
FIG. 3 is a signal diagram showing operating signals in the circuit of FIG. 1 for one example ratio of fast and slow clock speeds.

FIG. 3 shows operating signals in the circuit of FIG. 1 for one example ratio (e.g., approximately 8) of fast and slow clock speeds. In this example, the slow domain (second) circuit 102 is a PWM timer peripheral service by the fast domain CPU or processor first circuit 101. In this example, fast domain CPU provides a counter value to a PWM control peripheral second circuit 102 in a closed loop control application to control a pulse width of a power converter signal (not shown). The peripheral second circuit 102 decrements the count value, and issues and interrupt request signal IR when the count value reaches a predetermined value (e.g., "1" in this implementation). Curve 302 in FIG. 3 illustrates the slow clock signal SCLK, and curve 304 schematically illustrates the PWM timer/counter data value, in this case initially decrementing through values 3, 2, 1 and then 0, before being reprogrammed by the fast clock domain CPU to another value 2. The peripheral PWM timer second circuit 102 then decrements from this value 2 to 1 and then again to 0. In this example, the curve 306 illustrates the SET_FLAG signal output from the flip-flop 106, a curve 308 shows the fast domain clock signal FCLK, a curve 310 illustrates the interrupt output signal INT_OUT from the synchronizer circuit 120, and a curve 312 illustrates the CLEAR_FLAG signal from the flip-flop 116. The second circuit 102 in this example asserts the interrupt request signal IR in response to the counter value reaching "1". As seen in FIG. 3, the interrupt output signal INT_OUT undergoes a rising edge transition within two fast clock cycles of a rising edge in the SET_FLAG signal. In response to the interrupt output signal, the first circuit 101 begins an interrupt service routine or process. Once the first circuit 101 completes the interrupt service processing, the first circuit 101 asserts the acknowledgment signal ACK, and the flip-flop 116 generates a rising edge in the CLEAR_FLAG signal shown as curve 312. The CLEAR_FLAG signal transition clears the interrupt generator flip-flop 112, and the synchronizer circuit 120 causes the resulting falling edge in the interrupt output signal INT_OUT (curve 310) within two fast clock cycles.

The examples of FIGS. 2 and 3 illustrate the advantageous operation of the interrupt handling circuit 100 with respect to quick notification of the first circuit 101 of the occurrence of an interrupt event associated with the second circuit 102 (e.g., within two fast clock cycles). In addition, the circuit 100 provides fast asynchronous clearing of the interrupt signal (e.g., within two fast clock cycles) in response to assertion of the acknowledgment signal ACK by the first circuit 101. These quick response advantages of the disclosed interrupt handling circuitry 101 provide significant benefits as shown in FIGS. 2 and 3. Moreover, these advantages are more pronounced when the ratio between the fast and slow clock speeds is increased. Thus, the benefits of the disclosed circuits and techniques find particular utility in association with high-speed CPUs or other fast clock domain circuitry interacting with relatively slow clock speed second circuits 102.

FIG. 4 provides a signal diagram 400 showing a handshaking acknowledgment interrupt handling technique with a missed interrupt event. A curve 402 in FIG. 4 illustrates an example slow clock signal (labeled LOW CLOCK in FIG. 4), curve 404 illustrates another example of counter or timer values (PWM DATA) in a PWM timer peripheral, curve 406 shows an interrupt signal (INTERRUPT) from the PWM timer peripheral to a fast clock domain processor circuit, and curve 408 shows an example fast clock signal (FAST CLOCK). A curve 410 in FIG. 4 shows the interrupt signal synchronized to the fast clock signal, and a curve 412 shows an example interrupt clear event from the fast clock domain circuit. A further curve 414 illustrates the interrupt clear event signal synchronized to the slow clock signal, and a curve 416 illustrates the interrupt clear event acknowledge handshaking signal from the peripheral circuit to the fast clock domain circuit. The signals in FIG. 4 illustrate the adverse consequences of conventional handshaking/acknowledgment-based interrupt handling between fast and slow clock domain circuitry. As seen in the curves 404 and 406, for instance, the slow domain circuit 102 generates the interrupt signal IR in response to the counter value reaching "1", and the subsequent fast domain circuit interrupt service routine reprograms the slow domain PWM counter value to "2". However, the synchronization of the interrupt clearance event to the slow second clock signal (shown in curves 412, 414 and 416) introduces significant synchronization delays in providing a signal (falling edge of curve 414) to actually terminate the interrupt signaling (falling edge in the curve 406). In the interim delay, in this example, the PWM counter value has again transitioned to 1, but the fast clock domain circuit is unable to respond and properly service this second interrupt event. As noted above in FIGS. 1-3, the presently disclosed interrupt handling circuitry 100 advantageously provides quick asynchronous clearance of the interrupt request signaling, thereby facilitating proper interrupt service processing by the fast clock domain circuit 101 to avoid or mitigate the shortcomings illustrated in FIG. 4.

Figure 5:
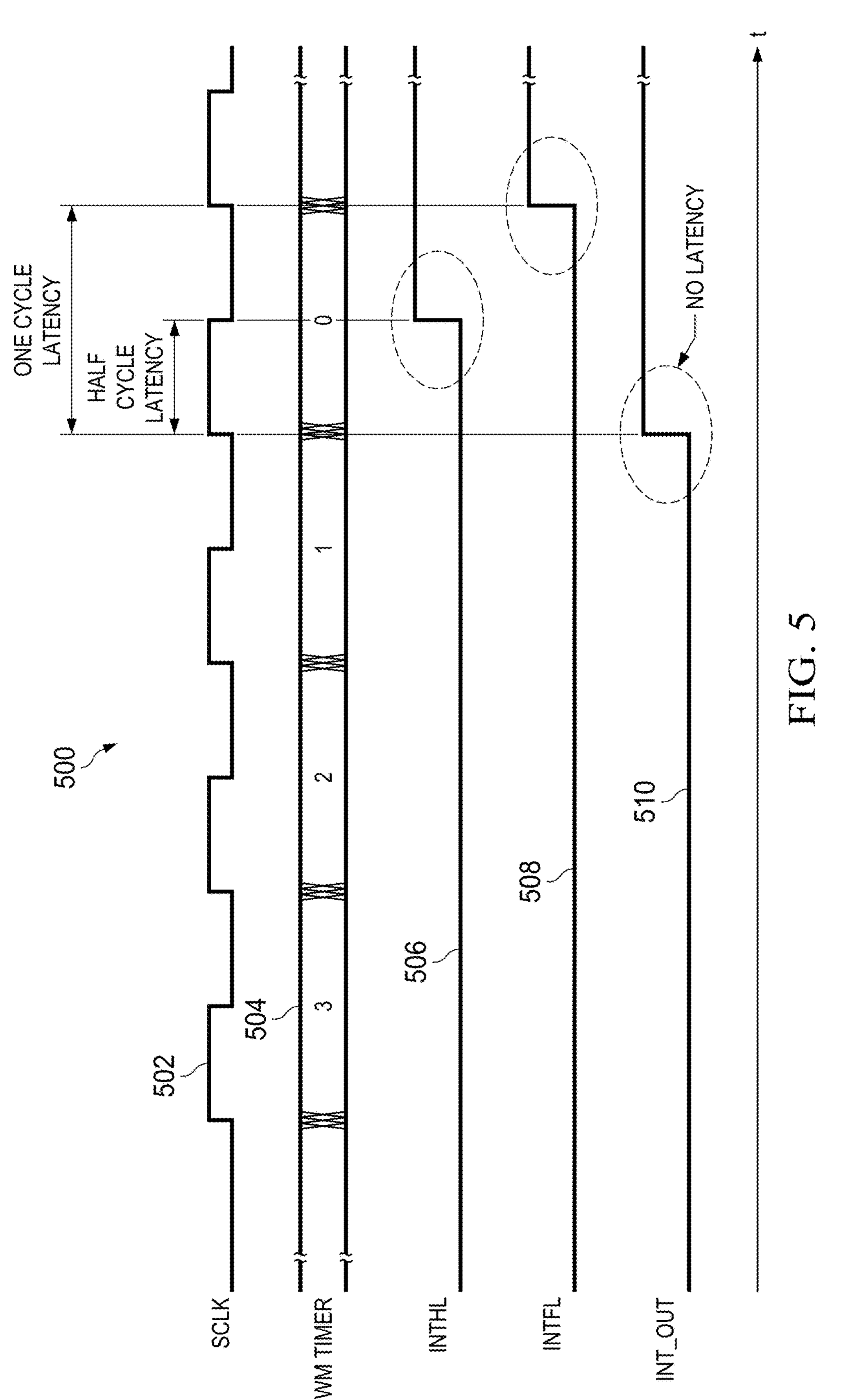
FIG. 5 is a signal diagram showing interrupt generation with synchronization delays.

FIG. 5 provides a signal diagram 500 illustrating advantages of the interrupt handling circuitry 100 with respect to fast interrupt request signal generation. FIG. 5 includes a curve 502 illustrating a slow clock signal SCLK, a curve 504 illustrating the PWM timer peripheral counter value, and curves 506, 508 and 510 illustrating generated interrupt signals with different latencies. In particular, curve 506 illustrates an interrupt signal (e.g., INTHL provided to a fast clock domain servicing circuit) with a half cycle latency corresponding to half a slow clock signal cycle, and curve 508 illustrates an interrupt signal INTFL with a full slow clock cycle latency. The curve 510, in contrast, shows the fast interrupt generation provided by the interrupt generator 110 and synchronizer 120 in FIG. 1 (INT_OUT) discussed above. As previously mentioned, previous solutions use synchronization circuitry (not shown) to synchronize signaling associated with an interrupt event in the slow clock circuitry, which introduces a half cycle delay (e.g., curve 506) or a full slow clock cycle delay (curve 508). The above-described circuit 100, in contrast, does not use slow clock domain synchronizers, and delivers the interrupt request signal SET_FLAG as the interrupt request line after it is synchronized to the fast clock domain as signal INT_OUT so that asynchronous logic is fully contained. In this regard, the SET_FLAG signal on node 111 is used as the clock to the flip-flop 112 that generates the interrupt input signal INT_IN, and the circuitry 110, 120 generates the interrupt output signal INT_OUT without any penalty in the slow clock domain.

Figure 6:
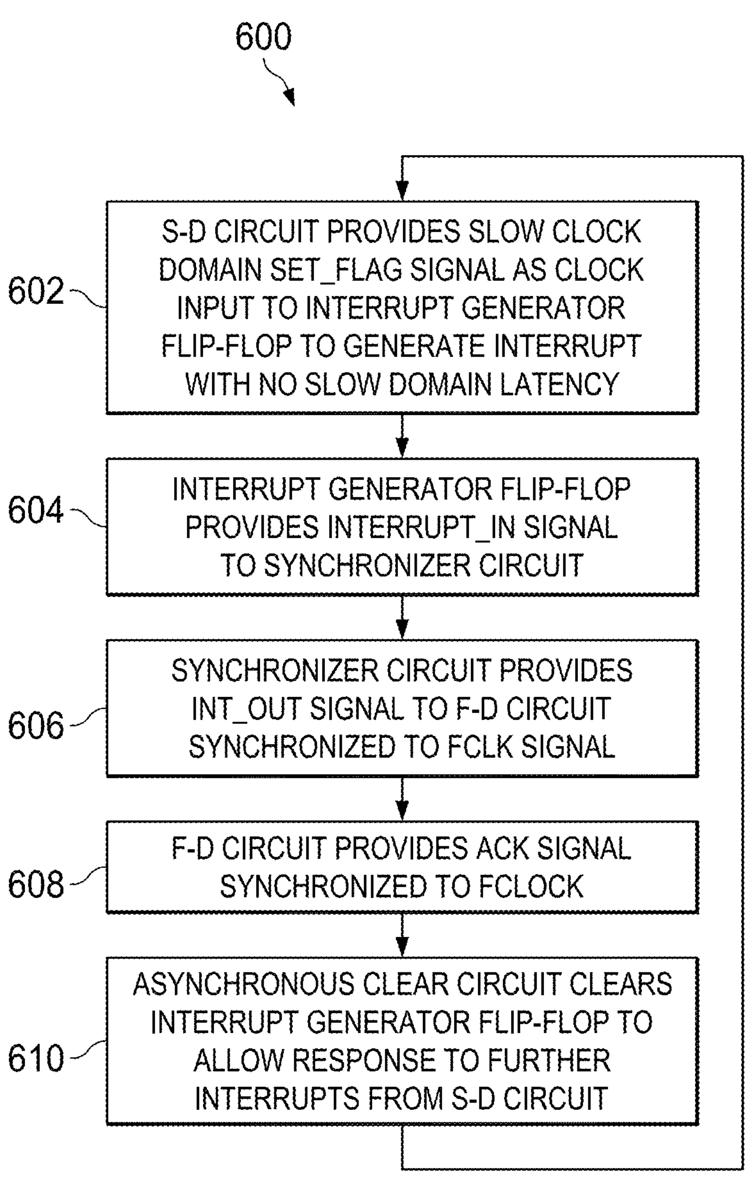
FIG. 6 is a flow diagram illustrating a process or method for managing interrupts of a fast domain circuit by a slow domain circuit.

FIG. 6 shows a method 600 to manage interrupts of a first circuit (e.g., circuit 101 above) operated according to a first clock signal by a second circuit (e.g., circuit 102) operated according to a second clock signal slower than the first clock signal. The method 600 can be implemented using any suitable interrupt handling circuitry, such as the circuit 100 illustrated and described above, or in other circuitry (not shown). At 602, an interrupt signal is generated, synchronized to the second clock signal. In one example, the slow clock domain circuit 102 above provides the SET_FLAG signal to the interrupt generator flip-flop 112, synchronized to the SCLK signal via the flip-flop 106. This generates the interrupt input signal INT_IN at 602 with no slow clock domain latency (e.g., avoids the delays shown in curves 506 and 508 of FIG. 5 above).

At 604 and 606, an interrupt output signal is provided to the first circuit 101 in response to the interrupt input signal. In the above example, the interrupt generator flip-flop 112 provides the interrupt input signal INT_IN to the synchronizer circuit 120 at 604 in FIG. 6, and the synchronizer circuit 120 provides the interrupt output signal INT_OUT to the first circuit 101 at 606, synchronized to the fast clock signal FCLK. At 608, the first circuit provides an acknowledgement signal (e.g., ACK above), synchronized to the fast clock signal FCLK. The method 600 further includes clearing the interrupt input and output signals at 610. In certain examples, the INT_IN and INT_OUT signals are cleared asynchronously with respect to the second clock signal SCLK by the clear circuitry 114, 116 in response to the acknowledgment signal ACK. In the above circuit 100, the interrupt input and output signals INT_IN and INT_OUT are quickly cleared within two cycles of the first clock signal FCLK after the clear flip-flop 116 receives the acknowledgment signal ACK.

The described examples provide significant response time advantages over other solution that use slow clock domain synchronization of clear event signals generated in the fast clock domain. As shown in FIG. 4, such alternate solutions consume two additional slow clock cycles for synchronization before actually clearing the interrupt signal provided to the fast clock domain circuitry. In contrast, the disclosed circuitry 100 and methods 600 avoid such additional interrupt clearing latency or delay by clearing the interrupt generated in the slow clock domain asynchronously to the slow clock signal SCLK. In the illustrated circuit 100, for example, the clear event signal ACK from the fast clock domain circuit 101 is used asynchronously to clear the same flip-flop 112 that generates the interrupt input signal INT_IN to reliably clear the interrupt output signal INT_OUT without any penalty in the slow clock domain. For interrupt generation, the disclosed circuits and methods deliver the interrupt output signal INT_OUT synchronously with respect to the fast clock signal FCLK using the synchronizer circuit 120 to ensure clean signaling to avoid any asynchronous paths (e.g., metastability). This synchronization in practice is a small delay, particularly where the first clock speed is significantly higher than the slow clock speed. In the disclosed circuit 100, moreover, implements a fast asynchronous clear path while still maintaining the final interrupt line to be fully synchronous to the fast clock domain.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

What is claimed is:

1. A circuit, comprising:

a first flip-flop including a first input and an output, wherein the first flip-flop is configured to:

receive, at the first input, a first signal representing an interrupt request; and generate, at the output, a first output signal based on the first signal;

a second flip-flop including a first input and an output, wherein the second flip-flop is configured to:

receive, at the first input, a second signal representing an acknowledgement of the interrupt request; and generate, at the output, a second output signal based on the second signal; and a third flip-flop including a first input, a second input, and an output, the first input coupled to the output of the first flip-flop, and the second input coupled to the output of the second flip-flop, wherein the third flip-flop is configured to:

generate, at the output, a third output signal based on the first output signal and the second output signal.

2. The circuit of claim 1, wherein the first input of the first flip-flop is a data input of the first flip-flop, wherein the first input of the second flip-flop is a data input of the second flip-flop, and wherein the first input of the third flip-flop is a clock input of the third flip-flop and the second input of the third flip-flop is a clear input of the third flip-flop.

3. The circuit of claim 2, wherein the first flip-flop includes a second input and is configured to receive a first clock signal at the second input, and wherein the second flip-flop includes a second input and is configured to receive a second clock signal at the second input.

4. The circuit of claim 3, wherein the second input of the first flip-flop is a clock input of the first flip-flop, and wherein the second input of the second flip-flop is a clock input of the second flip-flop.

5. The circuit of claim 3, wherein the first signal is generated according to the first clock signal, and the second signal is generated according to the second clock signal.

6. The circuit of claim 3, wherein a frequency of the first clock signal is different from a frequency of the second clock signal.

7. The circuit of claim 6, wherein the frequency of the first clock signal is less than the frequency of the second clock signal.

8. The circuit of claim 3, further comprising:

a fourth flip-flop including a first input and an output, the first input coupled to the output of the third flip-flop, wherein the fourth flip-flop is configured to:

generate, at the output, a fourth output signal based on the third output signal of the third flip-flop.

9. The circuit of claim 8, wherein the first input of the fourth flip-flop is a data input of the fourth flip-flop.

10. The circuit of claim 8, wherein the fourth flip-flop includes a second input and is configured to receive the second clock signal at the second input.

11. The circuit of claim 10, wherein the second input of the fourth flip-flop is a clock input of the fourth flip-flop.

12. The circuit of claim 1, wherein the third flip-flop includes a third input and is configured to receive, at the third input, a signal having a predetermined logic state.

13. The circuit of claim 12, wherein the third input of the third flip-flop is a data input of the third flip-flop.

14. The circuit of claim 12, wherein the predetermined logic state is a logic high state.

15. A method, comprising:

receiving, at a first input of a first flip-flop, a first signal representing an interrupt request, wherein the first flip-flop includes the first input and an output;

generating, at the output of the first flip-flop, a first output signal based on the first signal;

receiving, at a first input of a second flip-flop, a second signal representing an acknowledgement of the interrupt request, wherein the second flip-flop includes the first input and an output;

generating, at the output of the second flip-flop, a second output signal based on the second signal; and generating, at an output of a third flip-flop, a third output signal based on the first output signal and the second output signal, wherein the third flip-flop includes a first input, a second input, and the output, and wherein the first input is coupled to the output of the first flip-flop, and the second input is coupled to the output of the second flip-flop.

16. The method of claim 15, wherein the first input of the first flip-flop is a data input of the first flip-flop, wherein the first input of the second flip-flop is a data input of the second flip-flop, and wherein the first input of the third flip-flop is a clock input of the third flip-flop and the second input of the third flip-flop is a clear input of the third flip-flop.

17. The method of claim 15, further comprising:

receiving, at a second input of the first flip-flop, a first clock signal; and receiving, at a second input of the second flip-flop, a second clock signal.

18. The method of claim 17, wherein the second input of the first flip-flop is a clock input of the first flip-flop, and wherein the second input of the second flip-flop is a clock input of the second flip-flop.

19. The method of claim 17, wherein the first signal is generated according to the first clock signal, and the second signal is generated according to the second clock signal.

20. The method of claim 17, wherein the first clock signal has a frequency less than the second clock signal.

21. A system comprising:

a first circuit configured to:

operate based on a first clock signal; and produce an acknowledgement signal the acknowledgment signal synchronized to the first clock;

a second circuit configured to:

operate based on a second clock signal, wherein the second clock signal is slower than the first clock signal; and produce an interrupt request signal; and a third circuit coupled between the first circuit and the second circuit, the third circuit comprising:

a first flip-flop configured to generate a synchronized interrupt request signal synchronized to the second clock signal;

a second flip-flop configured to receive the synchronized interrupt request signal and to provide an interrupt input signal based on the synchronized interrupt request signal; and an interrupt clear circuit configured to:

receive the acknowledgment signal from the first circuit; and provide, to the second flip-flop, a clear signal that asynchronously resets the second flip-flop with respect to the second clock signal in response to the acknowledgment signal.

* * * * *